United States Patent
Hallo et al.

(10) Patent No.: US 6,482,473 B1
(45) Date of Patent: *Nov. 19, 2002

(54) COMPOSITION AND METHOD FOR DISSIPATING HEAT

(76) Inventors: Kenneth R. Hallo, 148 Burlwood Ct., Greer, SC (US) 29651; John L. Sheld, 279 Lockhard Cir., Troutman, NC (US) 28166

( * ) Notice: Subject to any disclaimer, the term of this patent is extended or adjusted under 35 U.S.C. 154(b) by 0 days.

This patent is subject to a terminal disclaimer.

(21) Appl. No.: 09/716,487

(22) Filed: Nov. 20, 2000

Related U.S. Application Data

(63) Continuation of application No. 09/277,075, filed on Mar. 26, 1999, now Pat. No. 6,168,834.

(51) Int. Cl.$^7$ .................................................. B05D 3/00
(52) U.S. Cl. .................... 427/372.2; 427/591; 427/592; 427/224; 252/601; 252/610; 252/611
(58) Field of Search ............................... 427/372.2, 591, 427/592, 224; 252/601, 610, 611

(56) References Cited

U.S. PATENT DOCUMENTS

| | | | | |
|---|---|---|---|---|
| 3,976,580 A | * | 8/1976 | Kaminstein et al. | ........... 252/2 |
| 5,773,706 A | * | 6/1998 | Wesley et al. | ................ 44/266 |

* cited by examiner

*Primary Examiner*—Jill Warden
*Assistant Examiner*—Monique T. Cole
(74) *Attorney, Agent, or Firm*—McNair Law Firm, P.A.

(57) ABSTRACT

A composition for increasing the dissipation of heat from one portion of a surface when heat is applied to another portion of the same surface. The preferred composition is a gel or paste with high water content and a thickener of a mineral clay in a colloidal suspension. The invention finds particular use in welding and soldering processes which are carried out adjacent heat sensitive materials.

9 Claims, No Drawings

COMPOSITION AND METHOD FOR DISSIPATING HEAT

CROSS REFERENCE TO RELATED APPLICATION

This application is a Continuation of application Ser. No. 09/277,075 filed Mar. 26, 1999 now U.S. Pat. No. 6,168,834.

FIELD OF THE INVENTION

This invention relates to a composition and method for increasing the dissipation of heat from the surface to which the composition is applied and for shielding surfaces from heat. This invention is particularly useful in welding and brazing operations and in situations where heat sensitive materials must be protected from processes which temporarily employ high concentrations of thermal energy.

BACKGROUND OF THE INVENTION

In many industrial and technical processes, high and intense concentrations of thermal energy in the form of flame, electrical resistance or discharge, laser, charged particle irradiation and other useful forms are often employed in a relatively confined space so that materials and work pieces cannot be readily and practically cooled by conventional means. This inability to dissipate and remove excess heat can limit production, produces undesirable effects and less than satisfactory results in certain operations, and may produce hazards that can result in damaged materials and fires. Particularly undesirable effects are excessive expansion or unsightly and unacceptable scorching or marring of metals or metal surfaces so that their utilization is significantly compromised.

Examples of specific processes where heat dissipation is of prime importance are welding operations and cutting operations with acetylene or electrical torches, especially the cutting and welding of the high melting point steels and similar alloys. Particularly, where costly alloys such as specialty stainless steels are used, distortions because of welding or cutting operations can be significantly costly. Other operations such as the sweating of copper pipes or tube joints in confined spaces near woodwork such as in the installation of water pipes in residential homes can present fire hazards with consequent endangerment of life and property. Accordingly, a principle object of the present invention is to provide a composition and method which will greatly reduce the aforementioned hazards and allow the performance of welding and brazing in locations and at speeds which are unattainable today.

Prior art approaches to solving the problem of heat dissipation have been to exercise extreme care in welding or brazing and to interrupt operations so that work pieces can cool down before they undesirably transfer heat to unwanted places. Another prior art approach has been to soak strips of fabric with a solution of fire retardants and apply these to the affected surface areas. However, it is difficult to position such strips and have them remain in effective contact with the surface to be cooled especially when the surface is vertical or inverted. Thus, it is another object of the present invention to provide a composition and method which can be used on surfaces in a wide variety of positions and configuration to cool them and dissipate heat.

Another prior art method has been to incorporate fire retardant chemicals into organic polymer slurries and spray or spread these onto the surface to be cooled. This method can be effective in terms of heat removal and flame retardation; but, once the water has evaporated from the polymer matrix the residue can react with the underlying metal surface, cause discoloration and unpleasant and unwanted smoke and vapors, and leave a residue that is difficult to remove. Accordingly, it is still another object of the present invention to provide a composition with sufficient heat absorbing capacity to cool a work piece in most operations without unpleasant and unsatisfactory vapors and residue.

Prior art compositions such as those disclosed in U.S. Pat. No. 5,035,951 to Dimanshteyn incorporate an inorganic aqueous coating which undergoes endothermic reactions when exposed to flame heat and acts as a thermal barrier up to about 2000° F. The coating contains water soluable alkali metal silicates, a hydrated metal silicate clay, and an inorganic particulate material. Another flame retardant is disclosed in U.S. Pat. No. 5,518,638 to Bull et al wherein the composition described can be sprayed on surfaces for preventing fires and comprises an aqueous mix of silicates and bentonite with mineral additives as thickeners. U.S. Pat. No. 5,709,821 to Von Bonin et al discloses a fire resistant gel which can be used for preventing fire with or without drying and the gel contains aluminum salts, phosphorus compounds, a alkali metal salt, and up to about 85% water. In addition, U.S. Pat. No. 4,983,326 to Vandersall describes a process for mixing thickener, water and other additives with known liquid fire retardants to produce a material that is about $2/3$ water. It is still a further object of the present invention to provide an improved gel composition with high water content which has improved and superior performance over previously known compositions.

The foregoing and other objects of the present invention will be understood and their solution appreciated by those skilled in the art after referring to the following summary of the invention and detailed description.

SUMMARY OF THE INVENTION

In one aspect, the present invention is the surprising discovery of a composition for increasing the dissipation of heat from a surface to which it is applied comprising 85% to 99.5% by weight of water and 15% to about 0.5% by weight of a magnesium silicate hectorite clay which forms a colloidal suspension gel when mixed with water. An especially preferred clay is laponite. The composition benefits from the adition of about 0.1% to about 1.0% by weight of an electrolyte which can be sodium nitrate for accelarating the thickening of the composition and from about 0.02% to about 0.06% by weight of the pyrophosphate salt as an inhibitor to aid in control of thickening the gel and, hence, the viscosity of the gel. (The more viscous gel may be referred to herein as a "paste" when appropriate.) About 0.5% to about 5% of a commercially known fire retardant is preferably added to achieve the most desirable form of the present invention.

In another aspect, the present invention is a composition comprising a minor portion of a magnesium silicate hectorite clay, a minor portion of a flame retardant, and a major portion of either distilled or de-ionized water wherein the composition is a translucent, thixotropic gel. In preparing said composition, still another aspect of the invention is the process wherein the laponite clay is first combined with water to produce a gel before addition of the fire suppressant which typically may include an inhibitor.

In still another aspect the present invention is a method of producing a composition for increasing the dissipation of heat from a surface to which it is applied comprising the steps of preparing a first mixture by blending water with about 0.5% to 3% by weight with a magnesium silicate hectorite clay to form a colloidal suspension said blending being performed with minimum agitation to reduce air entrapment. Sufficient electrolyte is added to accelerate the thickening process and a pyrophosphate salt is added as an inhibitor to control the thickening rate and final viscosity.

If the flame suppressant material contains an inhibitor the inhibitor may not be needed as an additive at this stage. A second mixture is prepared by mixing a commercially available fire suppressant with about 75% to 97% by weight of water and blending about 90% by weight of the first mixture with about 10% by weight of the second mixture using minimum agitation thereby producing a translucent, thixotropic gel.

In yet another aspect of the present invention is an improvement in the process for applying concentrated heat to a defined area on the surface of a high heat transfer material which is in contact with or adjacent to a region requiring protection from excessive heat by applying the aforementioned gel composition to the surface of the material at a point between the heated area and the region requiring protection whereby the heat applied is satisfactorily dissipated before being transferred to the protected region.

The gelled composition of the invention may preferably be applied in widths ranging from 1/8" to 3" and in depths in the range of 1/16" to 1/2" to a metal surface before welding or cutting and thereby preventing and/or reducing distortion of the metal from the heat of welding or of cutting the metal. The composition, because of its high water content and close contact with the underlying surface, dissipates and removes the excess heat by means of the evaporation of the water which is quite effective in reducing the heat transference along the metal surface beyond the point of application of the gel. In this respect it acts as an excellent heat sink and/or thermal barrier and rapidly and effectively dissipates heat.

In a further aspect, the present invention can act as a shield to direct flame. When coated onto a surface and subsequently direct flame is applied, the gel or paste will initially protect the underlying surface as water is evaporated from the gel. Continued application of heat will cause the gel to form a heat reflective crust which, for a period of time, will continue to protect the surface by reflecting heat away. This crust is principally formed by the fire suppressant in the gel.

DETAILED DESCRIPTION OF THE INVENTION

To prepare the composition of the invention the inorganic thickener, which is a magnesium silicate hectorite synthetic clay such as laponite that is manufactured by the LaPorte Company of the United Kingdom and distributed in the United States by Southern Clay Products, Inc. of Gonzales, Tex., is mixed under slight agitation with water, preferably distilled or de-ionized water, with a minimal amount of air entrapment to form a first mixture. Typically about 0.5% or less to 8% by weight of the inorganic thickener is used to provide the first mixture. This first step begins the gelling process.

In a second step, an electrolyte such as sodium nitrate, aluminum sulfate, or the like is added in a sufficient quantity to advance or accelerate the thickening process. Typically the amount will be from 0.1% to about 1.0% by weight. Also, to the first mixture a pyrophosphate salt is added as an inhibitor to control the rate of thickening and preferably this is about 0.02% to 0.06% by weight. Typical pyrophosphate salts are trisodium pyrophosphate (TSPP). However, as mentioned above, if the suppressant contains an inhibitor the TSPP may not be necessary.

In the next or third step of the process, a mixture of water and one or more of the following commercially available fire supressants is prepared. A preferred flame retardant is sold under the brand names ColdFire® by FireFreeze Worldwide of Rockaway, N.J. and Fire Strike® sold by BioGenesis, Inc. of Oak Creek, Wis. Other brand names are Pyrocap, Pyrocool, Fire Exterminator, Fire Stop, Flame Out, Fuel Buster, and Petrotech. These fire suppressants generally comprise ingredients in blended form such as non-ionic surfactants, and ionic surfactants, linear pyrophosphate, eucalyptus oil, and carbamide. This second mixture will comprise 75% to 97% of water with the remainder being one or more of the preceding described fire suppresants, all of which are well known to those skilled in the art.

In a fourth and final step, the second mixture is blended with the first mixture again with milder agitation to ensure the least amount of air entrapment. The first mixture comprises up about 90% of the total and the second mixture comprises the remaining approximately 10% of the total.

The composition can be manufactured with air entrained or entrapped in it and an effective product will result. The resulting product will be less viscous and more opaque. The liquid will be white in color because of the very small entrained air bubbles. For some applications this may be advantageous. The pyrophosphates will tend to reduce the air entrapment but also reduce the final viscosity.

On the other hand, it appears that the reduction of entrapped air does produce a more desirable translucent, thixotropic gel with higher density, that is, higher density because of less air thus resulting in better heat transfer within the gel itself for evaporation and heat removal.

The gel can be packed in dispensing tubes of the kind that toothpaste, caulking compounds, or adhesives are commonly dispensed from. The gel can also be dispensed from cans or jars and applied with a spatula or trowel. The best mode and preferred composition of the invention is as follows:

TABLE I

Percentages by Weight

|  | Gel | Paste |
|---|---|---|
| Water | 94% | 91.9% |
| Laponite | 5% | 7% |
| Sodium Nitrate | 0.5% | 0.6% |
| Fire Suppressant (Cold Fire ®) | 0.5% | 0.5% |

When used in welding applications, it is preferred that a bead of about 3/4" to 1" wide of the gel composition be applied to the metal surface before welding or cutting in order to prevent distortion to the metal from the heat of welding or cutting the metal. The thermal shield gel should be applied between the welding or cutting area and the area to be protected. It is not advisable to cut metal directly adjacent to the gel as the gel may lift from the metal and thus, less than maximum heat is transferred to the gel. It has been found that the gel should be at least 1/2" to 2" from the work area. Thermal gel is not quite as effective on aluminum due to its low density and rapid heat transfer. However, the gel of the invention performs quite well on stainless steel, carbon steel, copper, and like metals.

The composition of the present invention can also be made in a paste version which because of its stickiness is more satisfactory for vertical and overhead surfaces. The gel will temporarily protect adjacent surfaces from heat related damage or from catching fire. For maximum protection the composition can be applied to the surface to be protected at varying degrees of thickness depending on the quantity of heat to be dissipated. Thin coats of less than 1/8" can be applied to a surface when high heat is applied for relatively short times such as less than about 30 seconds. The thickness should be increased depending as the duration of the high heat increases. As much as 1/2" thickness may be applied to dissipate the heat during longer heat application times.

A typical gel or paste thickness is about 1/4" and this thickness provides excellent performance for most situations. However, the thermal shielding effect is only temporary as the gel will dry; and, as it loses water, its effectiveness as a heat sink is diminished. In 24 to 36 hours the gel will completely dry out but once dry it can be cleaned off with a wet cloth.

In one of its most useful applications, the thermal shield gel of the invention will reduce heat related damage in installing plumbing in buildings. It is not unusual when plumbing is installed in a typical wood frame house or building for there to be visible burn marks on the floor joices and there can also be damage to insulation and sheet rock. In addition, the heat transferred through pipes in close proximity to fittings, compressors, filters, or like equipment can cause significant damage. Dangerous fire occasionally results. To reduce or eliminate the transfer of unwanted heat along a pipe while soldering, the thermal gel can be applied completely around the pipe preferably at 1.5" to 4" from the work area. The gel should be preferably applied in a width of about 1" or 1½" and about 1/4" thick. In this configuration the gel will absorb the heat and greatly reduce the quantity that passes along the pipe. The paste version is preferred for pipe because of its improved adhesion properties when covering a circumferential area of the pipe.

Paste and gel versions of the present invention have been mentioned above and these versions can be produced by controlling the viscosity of the mixture by the addition of more or less laponite as described. The paste version is, of course, the more viscous whereas the gel version is less.

While this invention has been described with respect to specific examples and embodiments, it is to be understood that the invention is not limited thereto and that it can be variously practiced within the scope of the following claims.

The embodiments of this invention in which the exclusive property or privilege is claimed are defined as follows:

1. A process for protecting materials in adjacent regions from heat related damage when concentrated heat is applied to a defined area on the surface of a high heat transfer material comprising the steps of:
   a) providing a gel composition consisting essentially of at least about 85% but less than 99.0% by weight of water; about 15% to more than 0.5% by weight of a magnesium silicate hectorite clay which forms a colloidal suspension gel when mixed with water and about 0.5% to about 5.0% by weight of a surfactant;
   b) applying said composition to said surface at a point between the area to be heated and the region to be protected; and,
   c) subsequently applying heat whereby the heat applied is sufficiently dissipated before being transferred in a damaging quantity to the protected region.

2. The improved process of claim 1 wherein the high heat transfer material shaped objects including metal pipes, said metal being selected from the group consisting of copper, steel, iron, and aluminum and said composition is applied around the circumference of the pipe at a depth of 1/16" to 1/2".

3. The process of claim 1 wherein the application of a high concentration of heat results from a welding process.

4. The process of claim 2 wherein the metal object is a copper pipe, the application of high concentration of heat is from a brazing torch, and the protected region includes wooden support members adjacent said pipe.

5. The process of claim 4 including the step of applying said composition in a width of 1/2" to 3" around the circumference of said pipe.

6. The process of claim 1 wherein the magnesium silicate in the composition applied is in the range from about 5% to about 7% by weight and the water is in the range of 88% to 94.5% and the surfactant is in the range of 0.5% to 5%.

7. A process for protecting surfaces from the direct application of concentrated heat and for protecting adjacent regions when such heat is applied to high heat transfer materials, said process comprising the steps of:
   a) forming a colloidal suspension gel consisting essentially of a magnesium silicate hectorite clay and at least about 85% water by weight;
   b) applying said gel to a surface selected from the group consisting of surfaces of a material to be protected from direct application of heat and surfaces of a high heat transfer material adjacent the area where heat is to be applied;
   c) applying heat to said surface whereby said surface or adjacent region is protected against heat damage.

8. The process of claim 7 wherein said composition comprises at least 85% water by weight, the remainder including laponite and a surfactant, said composition forming a gel.

9. A process for protecting surfaces from the direct application of concentrated heat and for protecting adjacent regions when such heat is applied to high heat transfer materials, said process comprising the steps of:
   a) providing a composition comprising an inorganic thickener and water wherein the inorganic thickener is a synthetic clay which gels with the addition of water, said composition comprising at least about 85% water by weight; and
   b) applying said composition to a surface selected from the group consisting of surfaces of materials to be protected from direct application of heat and surfaces of a high heat transfer material adjacent the area where the heat is to be applied; and,
   c) after heating said surface and allowing it to cool, substantially no organic residue is left on said surface by said composition.

* * * * *